United States Patent
Schmidt et al.

(10) Patent No.: US 11,713,084 B2
(45) Date of Patent: Aug. 1, 2023

(54) BODY FRONT-END STRUCTURE FOR A VEHICLE

(71) Applicant: Volkswagen Aktiengesellschaft, Wolfsburg (DE)

(72) Inventors: Gerhard Schmidt, Wolfsburg (DE); Mario Ubaldo, Wolfsburg (DE); Soeren Krengel, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 42 days.

(21) Appl. No.: 17/510,736

(22) Filed: Oct. 26, 2021

(65) Prior Publication Data
US 2022/0041217 A1 Feb. 10, 2022

Related U.S. Application Data

(63) Continuation of application No. PCT/EP2020/059726, filed on Apr. 6, 2020.

(30) Foreign Application Priority Data

Apr. 26, 2019 (DE) ..................... 10 2019 206 041.2

(51) Int. Cl.
*B62D 25/08* (2006.01)
*B62D 21/15* (2006.01)
*B62D 25/04* (2006.01)

(52) U.S. Cl.
CPC ........... *B62D 25/08* (2013.01); *B62D 21/152* (2013.01); *B62D 25/04* (2013.01); *B62D 25/088* (2013.01)

(58) Field of Classification Search
CPC .... B62D 25/08; B62D 25/088; B62D 21/152; B62D 27/023

(Continued)

(56) References Cited

U.S. PATENT DOCUMENTS 7,703,805 B2 * 4/2010 Sasaki .................. B62D 21/152
296/203.02
9,352,711 B2 5/2016 Hoiss et al.
(Continued)

FOREIGN PATENT DOCUMENTS

CN 102791565 A 11/2012
CN 105730512 A 7/2016
(Continued)

OTHER PUBLICATIONS

International Search Report dated Jul. 17, 2020 in corresponding application PCT/EP2020/059726.
(Continued)

*Primary Examiner* — Dennis H Pedder
(74) *Attorney, Agent, or Firm* — Muncy, Geissler, Olds & Lowe , P.C.

(57) ABSTRACT

A body front-end structure for a two-track vehicle, having an A-pillar from which an upper wheel well longitudinal member projects toward the front of the vehicle in the longitudinal direction of the vehicle, and from which a lower body longitudinal member that is offset toward the inside of the vehicle with respect to the upper wheel well longitudinal member projects toward the front of the vehicle in the longitudinal direction of the vehicle. In a head-on crash with small lateral overlap, a suspension strut dome is loaded with a crash force in the longitudinal direction of the vehicle. The body front-end structure has a sheet-metal tension strip that connects the suspension strut dome to the lower body longitudinal member in a force-transmitting manner. In the event of a head-on crash, the sheet-metal tension strip provides a load path through which a tensile force opposing the crash force acts on the suspension strut dome.

10 Claims, 3 Drawing Sheets

(58) Field of Classification Search
USPC ... 296/203.01, 2, 187.09, 187.1, 198, 29, 30
See application file for complete search history.

(56) References Cited

U.S. PATENT DOCUMENTS

| | | | |
|---|---|---|---|
| 9,616,937 | B2 | 4/2017 | Susaki |
| 10,343,719 | B2 | 7/2019 | Hasseibach et al. |
| 11,142,248 | B2 | 10/2021 | Guenther et al. |
| 2013/0200653 | A1 | 8/2013 | Yasui et al. |
| 2014/0292028 | A1 | 10/2014 | Dix et al. |
| 2014/0326526 | A1 | 11/2014 | Yasui et al. |
| 2015/0061320 | A1 | 3/2015 | Yabu et al. |
| 2018/0370576 | A1 | 12/2018 | Shibata |

FOREIGN PATENT DOCUMENTS

| | | | |
|---|---|---|---|
| CN | 207565696 U | * | 7/2018 |
| DE | 2408259 A1 | | 9/1975 |
| DE | 4104894 A1 | | 9/1991 |
| DE | 19956430 A1 | | 5/2001 |
| DE | 102011004105 A1 | | 8/2012 |
| DE | 102013010563 A1 | | 1/2015 |
| DE | 102013015116 A1 | | 3/2015 |
| DE | 102014219433 A1 | | 3/2016 |
| DE | 102016008062 A1 | | 11/2017 |
| DE | 102017118515 B3 | | 10/2018 |
| EP | 1834862 A1 | | 9/2007 |
| EP | 3395655 A1 | | 10/2018 |
| JP | H11180343 A | | 7/1999 |
| JP | 2004330939 A | | 11/2004 |
| JP | 2012086777 A | | 5/2012 |

OTHER PUBLICATIONS

Translation of Chinese Office Action dated Jan. 31, 2023 in corresponding application 202080031620.5.

* cited by examiner

BODY FRONT-END STRUCTURE FOR A VEHICLE

This nonprovisional application is a continuation of International Application No. PCT/EP2020/059726, which was filed on Apr. 6, 2020, and which claims priority to German Patent Application No. 10 2019 206 041.2, which was filed in Germany on Apr. 26, 2019, and which are both herein incorporated by reference.

BACKGROUND OF THE INVENTION

Field of the Invention

The present invention relates to a body front-end structure for a vehicle.

Description of the Background Art

In the case of a vehicle frontal collision with only little lateral overlap (small overlap), the problem arises that the collision forces are not introduced directly into the bumper cross members on the front side and further into the body longitudinal members. Instead, in these specific accident circumstances, the introduction of force takes place past the bumper cross member and through the lateral body top section, which is to say through the upper wheel well longitudinal members and through the suspension strut dome, and into the relevant upper A-pillar node. In parallel thereto, the introduction of force takes place through the vehicle wheel facing the crash (which is to say the rim thereof) into the firewall located behind it that delimits the vehicle passenger compartment.

A generic body front-end structure for a vehicle is known from DE 10 2013 010 563 A1. The body front-end structure has A-pillars arranged on both sides, from each of the upper A-pillar nodes of which an upper wheel well longitudinal member projects toward the front of the vehicle in the longitudinal direction of the vehicle, and from each of the lower A-pillar nodes of which a lower body longitudinal member that is offset toward the inside of the vehicle with respect to the upper wheel well longitudinal member projects toward the front of the vehicle in the longitudinal direction of the vehicle, wherein a transverse assembly extends between the two A-pillars, and arranged in an inner corner region between the transverse assembly and the upper wheel well longitudinal member is a suspension strut dome that is adjoined in the longitudinal direction of the vehicle toward the vehicle front and in the vertical direction of the vehicle toward the vehicle bottom by a sheet-metal wheel well part that delimits the wheel well interior and that connects the lower body longitudinal member to the upper wheel well longitudinal member, wherein, in a head-on crash, in particular with small lateral overlap, the suspension strut dome is loaded with a crash force in the longitudinal direction of the vehicle.

In the abovementioned accident circumstances, a strong crash momentum is transmitted to the sheet-metal wheel well part and to the suspension strut dome on account of the small lateral overlap. This can lead to an intrusion into the A-pillar.

A motor vehicle front end is known from DE 10 2016 008 062 A1. A body arrangement for a front-end structure of a motor vehicle is known from both EP 3 197 751 B1 (which corresponds to U.S. Pat. No. 10,343,719) and DE 10 2014 219 433 A1 (which also corresponds to U.S. Pat. No. 10,343,719).

SUMMARY OF THE INVENTION

It is therefore an object of the present invention to provide a body front-end structure that ensures an increased dissipation of collision forces in a frontal collision with little additional manufacturing expense.

According to an exemplary embodiment, the body front-end structure has a sheet-metal tension strip. The sheet-metal tension strip connects the suspension strut dome to the lower body longitudinal member in a force-transmitting manner. In the event of a head-on crash with small lateral overlap, the sheet-metal tension strip provides a load path through which a tensile force opposing the crash force acts on the suspension strut dome in order to avoid a crash-induced displacement of the suspension strut dome toward the rear of the vehicle. Thus, with the aid of the sheet-metal tension strip, some of the crash momentum is transmitted to the lower body longitudinal member, which absorbs it and dissipates it by means of deformation energy. An intrusion into the A-pillar can be markedly reduced in this way.

In an example, the sheet-metal tension strip can be attached to the suspension strut dome at an upper joint and attached to the lower body longitudinal member at a lower joint. With regard to a further reinforcement of the front-end structure, it is preferred when the sheet-metal tension strip is attached to the sheet-metal wheel well part at a middle joint (which is to say between the upper and lower joints). Preferably, each of the joints is realized through a multiplicity of spot welds. Especially preferably, the sheet-metal tension strip and the sheet-metal wheel well part can form, at the middle joint, a double wall structure that reinforces the sheet-metal wheel well part. The double wall structure can extend continuously between the suspension strut dome and the lower body longitudinal member. In the double wall structure, the sheet-metal wheel well part and the sheet-metal tension strip can be in contact with one another over a large area.

For further reinforcement of the abovementioned double wall structure, a sheet-metal reinforcement part can be provided. This results in a triple sheet construction in which the sheet-metal wheel well part, the sheet-metal tension strip, and the sheet-metal reinforcement part are connected to one another, in particular in a spot-welded connection. The triple sheet construction can preferably be arranged at a distance from the upper joint and at a distance from the lower joint in order to avoid a four-sheet construction at the upper/lower joint, which is difficult to make from a manufacturing standpoint. The sheet-metal reinforcement part can serve in a dual function as a support bracket that carries a functional unit, in particular a drive unit. With regard to proper transmission of tensile force to the suspension strut dome in the event of a crash, it is preferred when the load path provided by the sheet-metal tension strip extends from the lower body longitudinal member toward the rear of the vehicle in the direction of the upper control arm plane in which the suspension strut dome is located. In this case, a sufficiently large longitudinal tensile force component arises that opposes the crash force. Such a load path arises when the lower joint of the sheet-metal tension strip on the lower body longitudinal member is arranged ahead of the upper joint of the sheet-metal tension strip on the suspension strut dome by a longitudinal offset.

The lower body longitudinal member can be designed as a hollow section member, namely with a channel profile section that is open toward the exterior of the vehicle in the transverse vehicle direction. The channel profile section can be closed with an outer covering part at an upper and at a lower flanged joint. The outer covering part can project past the upper flanged joint toward the top of the vehicle with a covering part overhang. In this case, the covering part overhang can be attached to the sheet-metal wheel well part in the lower joint (in particular by spot welding), namely with a free vertical offset above the upper flanged joint of the body longitudinal member. The sheet metal tension strip, the sheet-metal wheel well part, and the covering part overhang in this case can form a triple sheet construction in which the sheet metal tension strip, the sheet-metal wheel well part, and the covering part overhang are connected to one another. In addition, the sheet metal tension strip can form a triple sheet construction together with the upper flanged joint of the body longitudinal member, in which the sheet metal tension strip, the covering part, and the channel profile section are connected to one another.

The upper/lower edge flanges of the channel profile section and of the covering part are connected to one another (in particular by spot welding) at the respective upper/lower flanged joints of the body longitudinal member.

For further reinforcement of the body front-end structure in the case of a head-on crash, a sheet-metal reinforcement part can be provided that connects the suspension strut dome to the lower body longitudinal member in a force-transmitting manner separately from the sheet metal tension strip.

The suspension strut dome can be implemented as a formed sheet metal part, namely with a horizontally oriented upper support base on which a suspension strut head can be supported. The upper horizontal support base can transition into a vertical suspension strut front wall toward the front of the vehicle in the longitudinal direction of the vehicle, and can transition into a vertical suspension strut dome inner wall toward the inside of the vehicle in the transverse direction of the vehicle. The sheet-metal reinforcement part can be attached solely to the suspension strut dome inner wall at a distance from the sheet-metal tension strip. On the other hand, the sheet-metal tension strip can be attached to both the suspension strut dome inner wall and the suspension strut dome front wall. In this case, the sheet-metal tension strip encloses a transition edge between the suspension strut dome inner wall and the suspension strut dome front wall at the upper joint.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
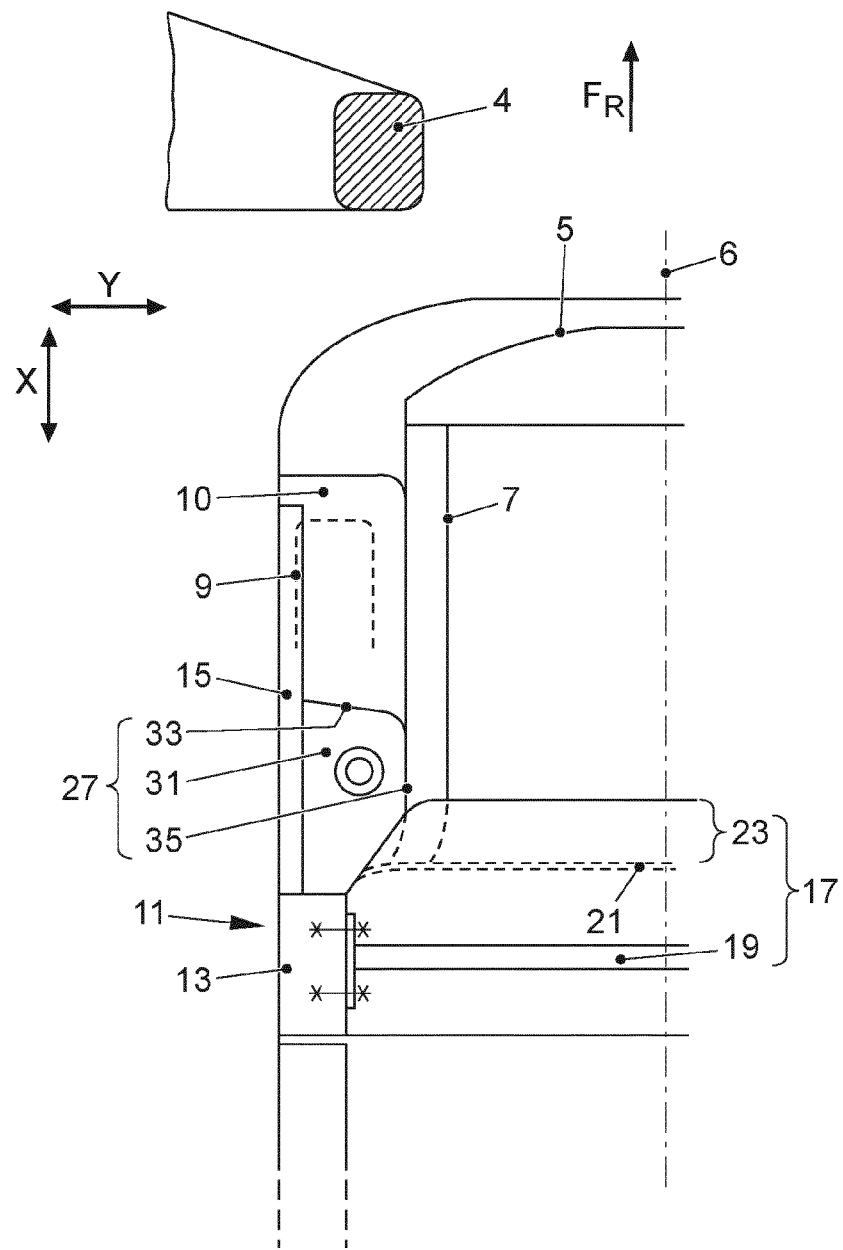
FIG. 1 is a schematic representation from above of a test setup for conducting a frontal collision with small lateral overlap.

In FIG. 1, a test setup is shown with which a vehicle collision with only small lateral overlap with a barrier 4 is simulated in which the impact area on the vehicle is largely located laterally outside of an indicated bumper cross member 5 on the front. For reasons of clarity, only the components required for understanding the invention are indicated in the vehicle. Thus, two body longitudinal members 7 adjoin the bumper cross member 5 to the rear in the vehicle longitudinal direction x. In FIG. 1, only one vehicle side of the body front-end structure is shown. The right-hand side of the body front-end structure, which is not shown, is designed in mirror-image with respect to the longitudinal center plane 6.

The body longitudinal members 7 form a lower longitudinal member plane and, viewed in the vehicle transverse direction y, extend inside the relevant wheel well 10 of the vehicle front wheel 9. In addition, upper wheel well longitudinal members 15 are provided that form the upper longitudinal member plane.

The body front-end structure has two A-pillars 11 that are opposite one another in the vehicle transverse direction y, of which only an upper A-pillar node 13 is indicated in FIG. 1. The upper wheel well longitudinal member 15 and a transverse assembly 17 converge in the upper A-pillar node 13. A module cross member 19, a firewall 21, and a radiator tank 23 can be integrated into the transverse assembly 17. The module cross member 19 is attached to the upper A-pillar node 13 as a rigid assembly through indicated attachment points 20. The transverse assembly 17 is attached to the A-pillar 11 as a rigid assembly through attachment points. As is additionally evident from FIG. 1, an inner corner region between the transverse assembly 17 and the upper wheel well longitudinal member 15 is spanned by a suspension strut dome 27. The suspension strut dome 27 is rigidly attached to both the transverse assembly 17 and the upper wheel well longitudinal member 15, via which the inner corner region between the transverse assembly 17 and the upper wheel well longitudinal member 15 is reinforced as a rigid assembly.

The sheet-metal wheel well part 29 adjoins the suspension strut dome 27 in the longitudinal direction x of the vehicle toward the vehicle front and in the vertical direction z of the vehicle toward the vehicle bottom, and connects the lower body longitudinal member 7 to the upper wheel well longitudinal member 15 in a force-transmitting manner.

As is further evident from the figures, the suspension strut dome 27, which is implemented as a formed sheet metal part, has an upper, horizontally oriented support base 31 against which a suspension strut head (not shown) can be braced. The suspension strut dome support base 31 transitions into a vertical suspension strut front wall 33 toward the front of the vehicle in the longitudinal direction x of the vehicle (FIG. 2), and into a vertical suspension strut dome inner wall 35 toward the inside of the vehicle in the transverse direction y of the vehicle.

Figure 2:
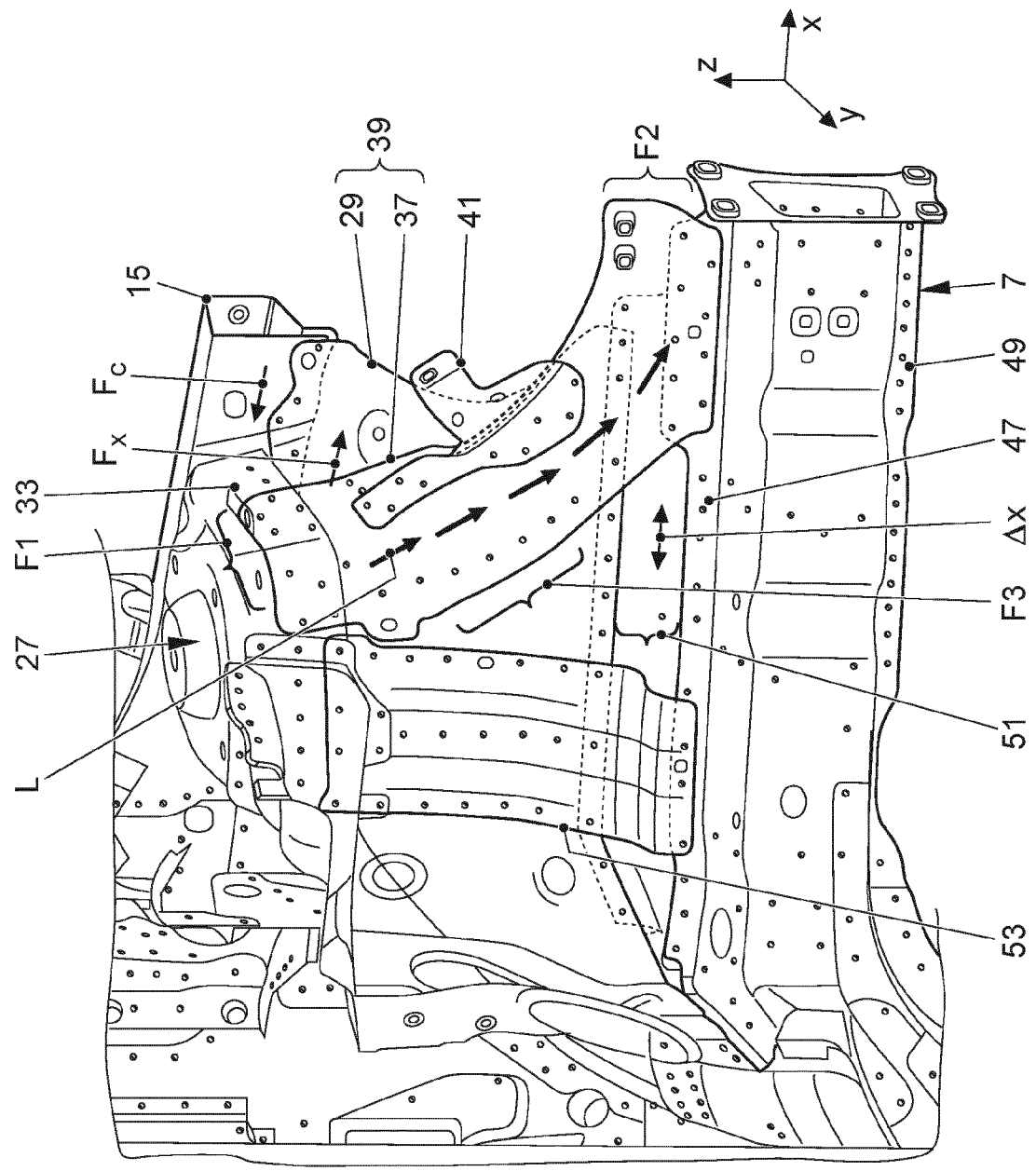
FIG. 2 shows the body front-end structure in a perspective partial view from inside.
Figure 3:
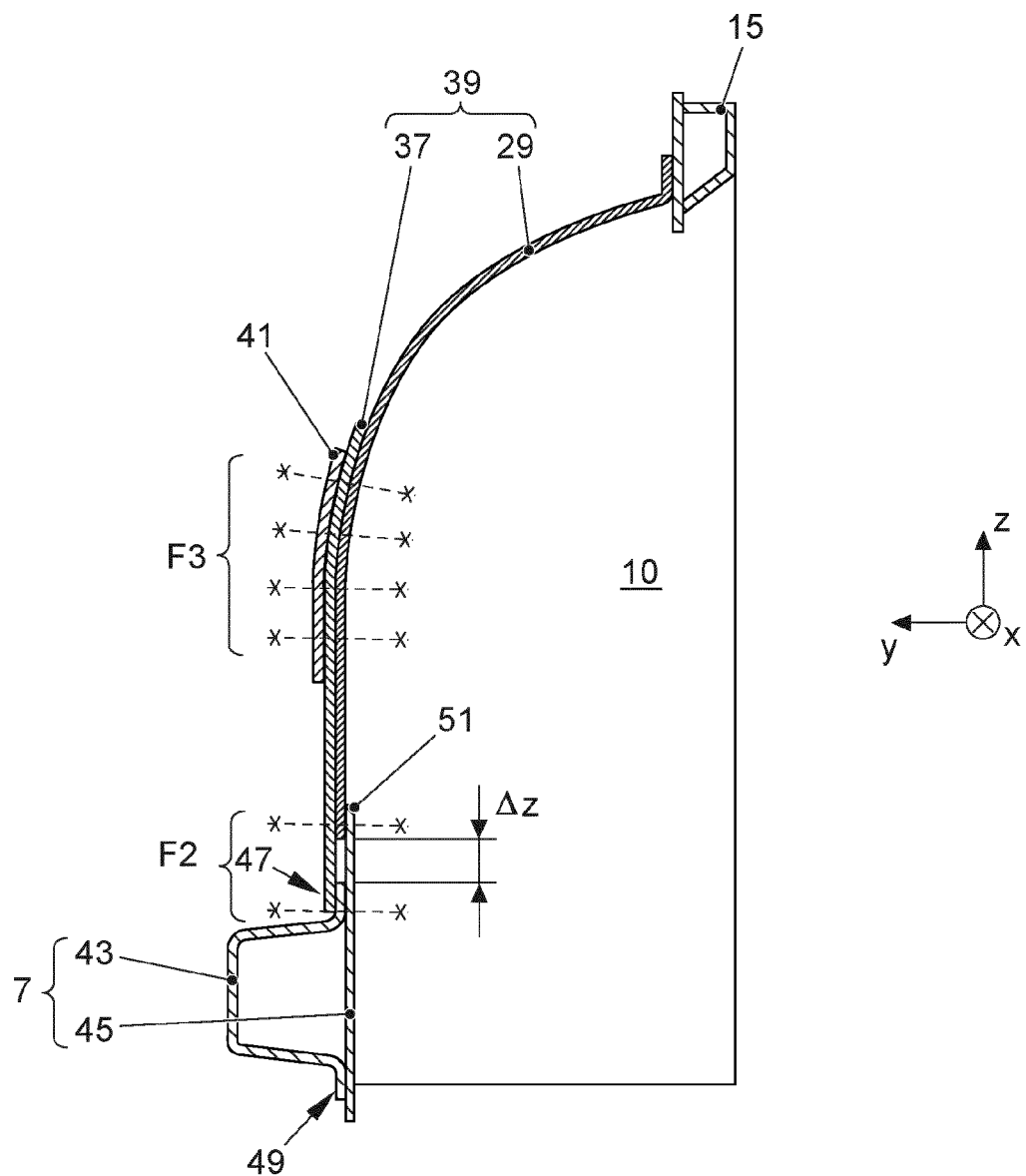
FIG. 3 is a schematic sectional view along a section plane yz from FIG. 2.

In FIGS. 1 to 3, a sheet-metal tension strip 37 is provided that is attached at an upper joint F1 to the suspension strut dome 27 (which is to say to both the suspension strut dome front wall 33 and the suspension strut dome inner wall 35) by spot welding. The sheet-metal tension strip 37 is also attached to the lower body longitudinal member 7 at a lower joint F2. Furthermore, the sheet-metal tension strip 37 is attached directly to the sheet-metal wheel well part 29 at a middle joint F3, namely with the formation of a double wall structure 39 (FIG. 3), which extends continuously between the suspension strut dome 27 and the lower body longitudinal member 7, and in which the sheet-metal wheel well part 29 and the sheet-metal tension strip 37 are in contact over a large area.

For reinforcement of the double wall structure 39, a sheet-metal reinforcement part 41 is provided in FIG. 2, producing a triple sheet construction in which the sheet-metal wheel well part 29, the sheet-metal tension strip 37, and the sheet-metal reinforcement part 41 are connected to one another by spot-welding. In FIG. 2, the triple sheet construction is arranged both at a distance from the upper joint F1 and at a distance from the lower joint F2. The sheet-metal reinforcement part 41 in FIG. 2 additionally acts as a support bracket on which a drive unit that is not shown can be supported.

As is further evident from FIG. 2, the lower joint F2 is arranged ahead of the upper joint F1 by a longitudinal offset Δx.

It is evident from FIG. 3, moreover, that the lower body longitudinal member 7 has a channel profile section 43 that is open toward the exterior of the vehicle in the transverse vehicle direction y and is closed with an outer covering part 45 at upper and lower flanged joints 47, 49. In FIG. 2 or 3, the outer covering part 45 projects past the upper flanged joint 47 toward the top of the vehicle with an overhang 51. In this sheet metal construction, the lower joint F2 is implemented as follows: the covering part overhang 51 is thus attached to the sheet-metal wheel well part in the lower joint F2, namely with a vertical offset Δz above the upper flanged joint 47 of the body longitudinal member 7. The sheet metal tension strip 37, the sheet-metal wheel well part 29, and the covering part overhang 51 in this case form a triple sheet construction in which the sheet metal tension strip 37, the sheet-metal wheel well part 29, and the covering part overhang 51 are connected to one another by spot welding.

In addition, the sheet metal tension strip likewise forms a triple sheet construction together with the upper flanged joint 47 of the body longitudinal member 7 at the lower joint F2, in which the sheet metal tension strip 37, the covering part 45, and the channel profile section 43 are connected to one another by spot welding.

In FIG. 2, an additional sheet-metal reinforcement part 53 is installed in addition to the sheet metal tension strip 37. The sheet-metal reinforcement part 53 connects the suspension strut dome 27 (which is to say the suspension strut dome inner wall 35) to the lower body longitudinal member 7 in a force-transmitting manner. In FIG. 2, the sheet-metal reinforcement part 53 likewise forms a double wall structure as a rigid assembly together with the sheet-metal wheel well part 29, by means of which tensile and/or compressive forces in the event of a head-on crash with small lateral overlap can be transmitted between the upper control arm plane and the lower control arm plane.

In the event of a head-on crash with small lateral overlap, the suspension strut dome 27 is loaded with a crash force $F_c$ (FIG. 2) toward the rear of the vehicle in the longitudinal direction (x) of the vehicle. The crash force $F_c$ acting toward the rear of the vehicle is opposed by a tensile force that runs along a load path L (FIG. 2) provided by the sheet metal tension strip 37. As a result, a crash-induced displacement of the suspension strut dome (27) toward the rear of the vehicle can be avoided. As is evident from FIG. 2, the load path L runs toward the rear of the vehicle in the direction of the upper control arm plane in which the suspension strut dome 27 is located. The tensile force acting on the suspension strut dome 27 thus has a longitudinal tensile force component $F_x$ that opposes the crash force $F_c$.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A body front-end structure for a two-track vehicle, the body front-end structure comprising:
   an A-pillar from which an upper wheel well longitudinal member projects towards a front of the vehicle in a longitudinal direction of the vehicle, and from which a lower body longitudinal member that is offset towards an inside of the vehicle with respect to the upper wheel well longitudinal member projects toward the front of the vehicle in the longitudinal direction of the vehicle;
   a transverse assembly extending in a transverse direction of the vehicle;
   a suspension strut dome arranged in an inner corner region between the transverse assembly and the upper wheel well longitudinal member, the suspension strut dome being adjoined in the longitudinal direction of the vehicle toward the front of the vehicle and in a vertical direction of the vehicle toward a bottom of the vehicle by a sheet-metal wheel well part that delimits a wheel well interior and that connects the lower body longitudinal member to the upper wheel well longitudinal member, wherein, in a head-on crash with small lateral overlap, the suspension strut dome is loaded with a crash force in the longitudinal direction of the vehicle; and
   a sheet-metal tension strip that connects the suspension strut dome to the lower body longitudinal member in a force-transmitting manner, wherein, in the head-on crash, the sheet-metal tension strip provides a load path through which a longitudinal tensile force opposing the crash force acts on the suspension strut dome in order to avoid a crash-induced displacement of the suspension strut dome toward a rear of the vehicle,
   wherein the sheet-metal tension strip is attached to the suspension strut dome at an upper joint, wherein the sheet-metal tension strip is attached to the lower body longitudinal member at a lower joint, wherein the sheet-metal tension strip is attached to the sheet-metal wheel well part at a middle joint between the upper and lower joints.

2. The body front-end structure according to claim 1, wherein, each of the joints has a plurality of spot welds.

3. The body front-end structure according to claim 1, wherein the sheet-metal tension strip and the sheet-metal wheel well part form, at the middle joint, a double wall structure that extends continuously between the suspension strut dome and the lower body longitudinal member and in which the sheet-metal wheel well part and the sheet-metal tension strip are in contact with one another over a large area.

4. The body front-end structure according to claim 3, wherein a sheet-metal reinforcement part is provided for reinforcement of the double wall structure, to form a triple sheet construction in which the sheet-metal wheel well part, the sheet-metal tension strip and the sheet-metal reinforcement part are connected to one another or have a spot-welded connection, and wherein the triple sheet construction is arranged at a distance from the upper joint and at a distance from the lower joint.

5. The body front-end structure according to claim 1, wherein the lower joint is arranged ahead of the upper joint by a longitudinal offset so that the load path in the head-on crash extends from the lower body longitudinal member toward the rear of the vehicle in the direction of the suspension strut dome, so as to form the longitudinal tensile force that opposes the crash force.

6. The body front-end structure according to claim 1, wherein the lower body longitudinal member has a channel profile section that is open toward an exterior of the vehicle in the transverse direction of the vehicle, and wherein the channel profile section is closed with an outer covering part at an upper flanged joint and a lower flanged joint, and wherein the outer covering part projects past the upper flanged joint toward a top of the vehicle with an overhang, and wherein, in the lower joint, the overhang is attached to the sheet-metal wheel well part with a vertical offset above the upper flanged joint.

7. The body front-end structure according to claim 6, wherein the sheet-metal tension strip, the sheet-metal wheel well part and the overhang form a triple sheet construction in which the sheet metal tension strip, the sheet-metal wheel well part and the overhang are connected to one another.

8. The body front-end structure according to claim 6, wherein the sheet-metal tension strip forms a triple sheet construction together with the upper flanged joint in which the sheet metal tension strip, the outer covering part and the channel profile section are connected to one another.

9. The body front-end structure according to claim 4, further comprising an additional sheet-metal reinforcement part that connects the suspension strut dome to the lower body longitudinal member in a force-transmitting manner separately from the sheet metal tension strip, wherein the suspension strut dome has a horizontally oriented upper support base that transitions into a vertical suspension strut dome front wall facing toward the front of the vehicle in the longitudinal direction of the vehicle, and transitions into a vertical suspension strut dome inner wall facing toward the inside of the vehicle in the transverse direction of the vehicle, wherein the additional sheet-metal reinforcement part is attached to the suspension strut dome inner wall at a distance from the sheet-metal tension strip, and wherein the sheet metal tension strip is attached both to the suspension strut dome inner wall and to the suspension strut dome front wall.

10. The body front-end structure according to claim 4, wherein the sheet-metal reinforcement part is a support bracket.

* * * * *